(12) United States Patent
Van Baelen et al.

(10) Patent No.: US 9,703,063 B2
(45) Date of Patent: Jul. 11, 2017

(54) CABLE OVER-LENGTH STORAGE SYSTEM

(71) Applicant: COMMSCOPE CONNECTIVITY BELGIUM BVBA, Kessel-Lo (BE)

(72) Inventors: David Jan Irma Van Baelen, Winksele (BE); Thierry Declerck, Kumtich (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 14/441,407

(22) PCT Filed: Nov. 7, 2013

(86) PCT No.: PCT/EP2013/073207
§ 371 (c)(1),
(2) Date: May 7, 2015

(87) PCT Pub. No.: WO2014/072369
PCT Pub. Date: May 15, 2014

(65) Prior Publication Data
US 2015/0286023 A1  Oct. 8, 2015

Related U.S. Application Data

(60) Provisional application No. 61/723,634, filed on Nov. 7, 2012.

(51) Int. Cl.
*G02B 6/00* (2006.01)
*G02B 6/44* (2006.01)
*G02B 6/46* (2006.01)

(52) U.S. Cl.
CPC ......... *G02B 6/4458* (2013.01); *G02B 6/4457* (2013.01); *G02B 6/4466* (2013.01); *G02B 6/46* (2013.01); *Y10T 29/49947* (2015.01)

(58) Field of Classification Search
CPC .. G02B 6/4458; G02B 6/4457; G02B 6/4466; G02B 6/46
(Continued)

(56) References Cited

U.S. PATENT DOCUMENTS 7,715,679 B2  5/2010  Kowalczyk et al.
7,756,379 B2  7/2010  Kowalczyk et al.
(Continued)

FOREIGN PATENT DOCUMENTS

EP          2 159 618       3/2010
WO     WO 2011/146722      11/2011
WO     WO 2011/156969      12/2011

OTHER PUBLICATIONS

International Search Report for International Application No. PCT/EP2013/073207 mailed Apr. 15, 2014 (4 pages).

*Primary Examiner* — Jerry Blevins
(74) *Attorney, Agent, or Firm* — Merchant & Gould, P.C.

(57) ABSTRACT

A subscriber interface unit (60) can be installed by attaching a storage spool (120) to a wall using a fastener (180); deploying a pre-wound cable (50) from the storage spool (120) by turning the storage spool (120) about the fastener (180); and mounting the subscriber interface unit (60) on the storage spool (120). The storage spool (120) includes a drum portion (122) having a side wall (128) and a rear end wall (129). The rear end wall (129) defines a fastener opening (125) aligned with an axis of rotation of the spool (120). A flange portion (124) is coupled to a front end (121) of the drum portion (122). The spool (120) can define a slot (170) having a radial portion (170A) that extends though the flange portion (124) and an axial portion (170B) that extends through the side wall (128) of the drum portion (122).

23 Claims, 16 Drawing Sheets

(58) Field of Classification Search
USPC .................................. 385/135; 29/525.01
See application file for complete search history.

(56) References Cited

U.S. PATENT DOCUMENTS

| | | | |
|---|---|---|---|
| 7,869,682 B2 | 1/2011 | Kowalczyk et al. | |
| 8,254,740 B2 | 8/2012 | Smith et al. | |
| 8,265,447 B2 | 9/2012 | Loeffelholz et al. | |
| 8,515,234 B2 | 8/2013 | LeBlanc et al. | |
| 8,805,152 B2 | 8/2014 | Smith et al. | |
| 9,042,700 B2 | 5/2015 | Smith et al. | |
| 9,097,870 B2 | 8/2015 | Torman et al. | |
| 2009/0317047 A1* | 12/2009 | Smith | G02B 6/3897 385/135 |
| 2011/0311226 A1 | 12/2011 | Smith et al. | |
| 2011/0317974 A1 | 12/2011 | Krampotich et al. | |
| 2012/0025005 A1* | 2/2012 | Smith | B65H 75/146 242/603 |
| 2012/0067997 A1* | 3/2012 | Ingles | B65H 63/006 242/470 |
| 2012/0251053 A1* | 10/2012 | Kowalczyk | G02B 6/3897 385/75 |
| 2015/0309276 A1 | 10/2015 | Collart et al. | |

\* cited by examiner

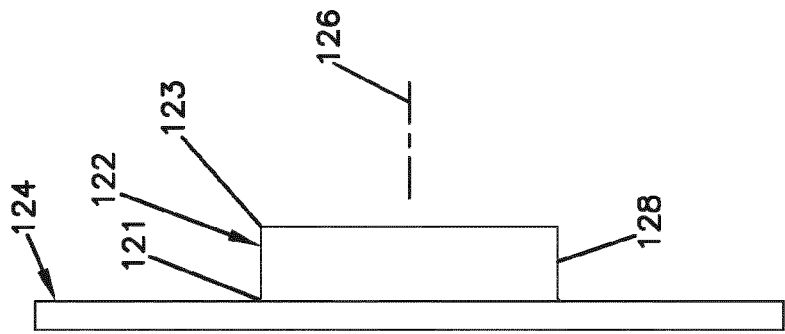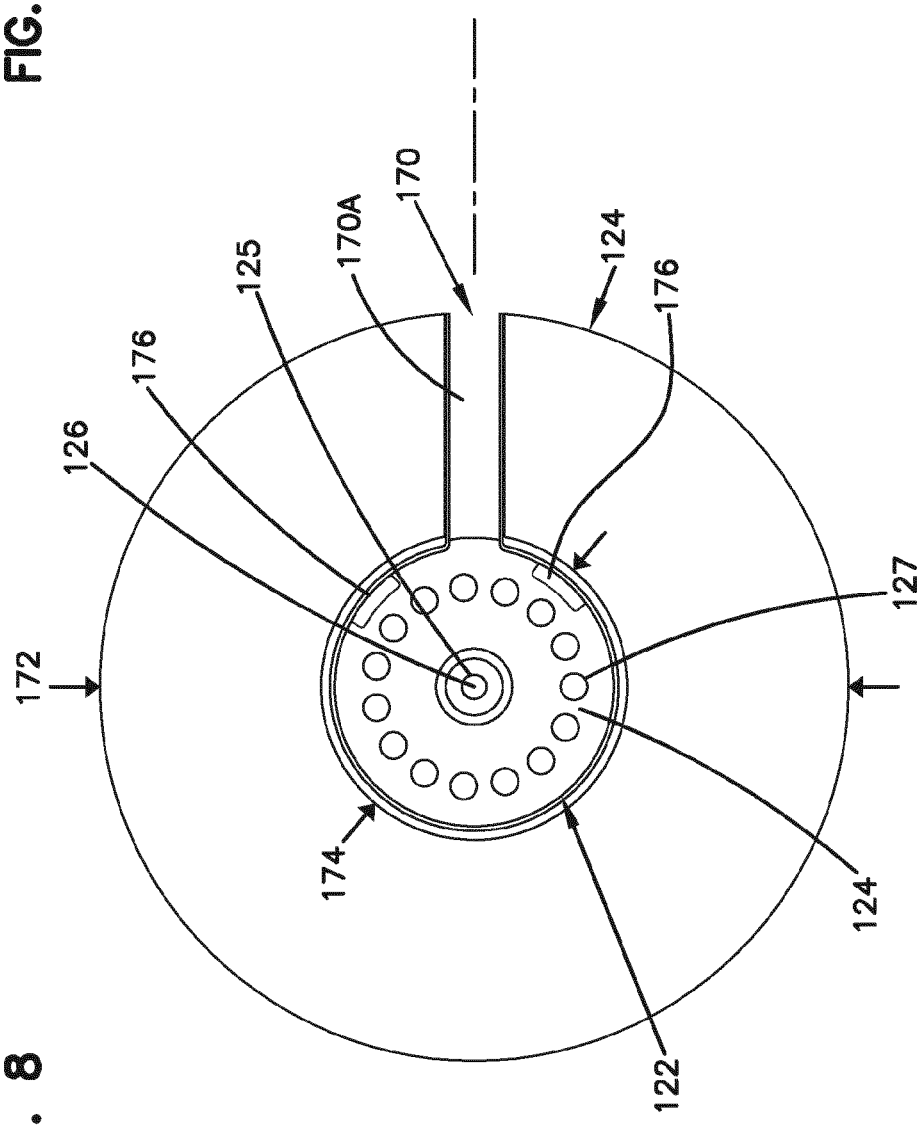

CABLE OVER-LENGTH STORAGE SYSTEM

This application is a National Stage Application of PCT/EP2013/073206, filed 7 Nov. 2013, which claims benefit of U.S. Provisional Ser. No. 61/723,646, filed 7 Nov. 2012 and which applications are incorporated herein by reference. To the extent appropriate, a claim of priority is made to each of the above disclosed applications.

BACKGROUND

As demand for telecommunications increases, fiber optic networks are being extended in more and more areas. In facilities such as multiple dwelling units (MDU's), apartments, condominiums, businesses, etc., fiber optic distribution terminals are used to provide subscriber access points to the fiber optic network. Fiber optic distribution terminals are often installed at separate floors of an MDU and are connected to the fiber optic network through cables connected to a network hub. The length of cable needed between the fiber optic enclosure and the network hub varies depending upon the location of the fiber optic enclosure with respect to the network hub. As a result, there is a need for a fiber optic enclosure that can effectively manage varying lengths of cable. Cables are also used to interconnect the subscriber access points provided by the fiber distribution terminals with subscriber interface units (e.g., Optical Network Terminals) provided at subscriber locations (e.g., at each residence of an MDU). With respect to such fiber distribution systems, there is also a need for techniques to effectively managing excess cable length while also taking into consideration space constraints.

SUMMARY

The present disclosure relates to methods and structures for effectively managing and storing cable over-lengths. In one example, excess cable is stored on a cable storage spool that is mounted between a subscriber interface unit (e.g., an ONT) and a wall. In one example, the spool includes a drum portion and a single flange. In one example, the spool includes a slot having a radial portion that extends through the flange and an axial portion that extends through a side wall of the drum portion in a direction along an axis of rotation of the spool. In one example, the subscriber interface unit is hung on fasteners secured to the flange of the spool. In one example, the fasteners are self-tapping screws. In one example, the drum portion includes an end wall defining a central opening for receiving a fastener that is aligned along the axis of rotation of the spool and at least one rotation locking opening offset from the central opening for receiving a fastener used to lock rotation of the spool about the axis of rotation. In one example, the side wall of the drum portion defines one or more cable tie-down locations.

In one example, the spool is secured to a desired subscriber interface mounting location (e.g., a wall); a first end portion of a cable is secured (e.g., tied down) to the spool; excess cable is coiled on the spool by turning the spool about its axis of rotation; the spool is locked to prevent rotation once the excess cable has been coiled; and the subscriber interface unit is mounted (e.g., hung) on the front side of the spool. In one example, the cable is pre-coiled on the spool with a first end portion of the cable secured to the spool; the spool is fastened to a desired subscriber interface unit mounting location; the cable is paid out from the spool by pulling a second end portion of the cable and rotating the spool about the axis of rotation; the spool is locked against rotation once the desired length of cable has been paid out; and the subscriber interface unit is mounted to the front of the spool. In one example embodiment, the first end portion of the cable can be connectorized and can be plugged into the subscriber interface unit before or after the subscriber interface unit is mounted on the spool. In one example, the spool is fastened to a wall or other upright structure.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 8 is a front view of the spool of FIG. 6.

FIG. 9 is a side view of the spool of FIG. 6.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
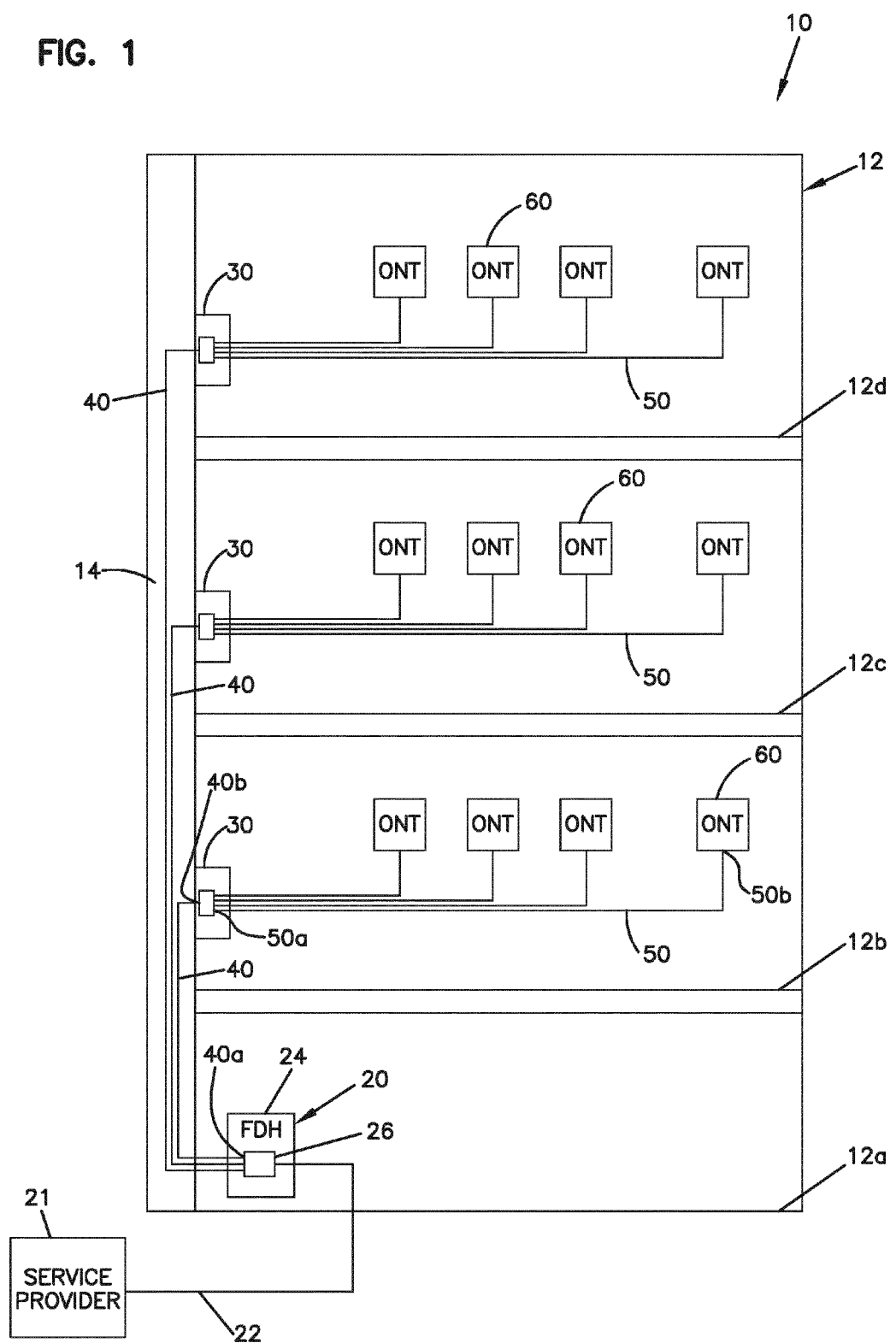
FIG. 1 is a schematic view of a fiber optic distribution system in accordance with the principles of the present disclosure shown incorporated into a multi-dwelling unit.
Figure 2:
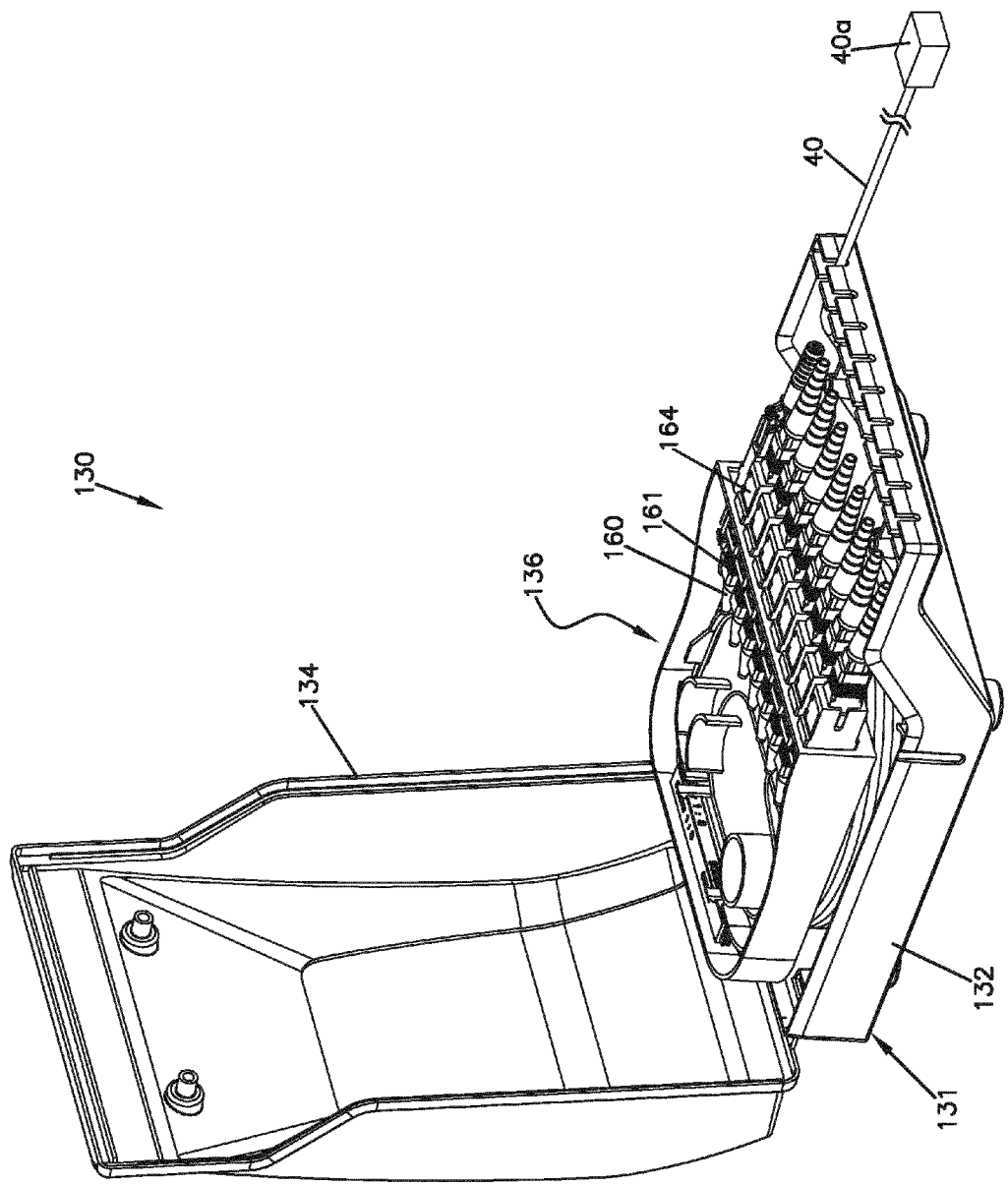
FIG. 2 is a perspective view of a fiber optic distribution terminal suitable for use in the fiber distribution system of FIG. 1.

Referring to FIG. 1, an example fiber optic distribution system 10 in accordance with the principles of the present disclosure is shown. The fiber optic distribution system 10 is shown incorporated into a building, such as a multi-dwelling unit (MDU) 12, having multiple floors 12a, 12b, 12c and 12d (i.e., multiple levels). The floor 12a can be a basement. A riser 14 can run between the various floors 12a-12d. While depicted in an MDU, it will be appreciated that the fiber distribution system 10 can be used in other types buildings and other types of applications.

The fiber distribution system 10 is shown including a fiber distribution hub 20 installed at the floor 12a (e.g., typically in the basement or lowest floor of the building). The fiber distribution hub 20 is shown receiving at least one feed fiber 22 routed from a service provider 21 (e.g., from a central office of a service provider). The fiber distribution hub 20 can include a housing 24 that encloses one or more optical splitters 26. The optical splitter 26 can be configured to split optical signals supplied to the fiber distribution hub 20 by the feed fiber 22. Outputs of the optical splitter 26 can be optically connected to optical fibers routed to the various floors 12b-12d of the building. The housing 24 can also enclose various structures for making optical connections between optical fibers of optical cables. For example, the housing can include a plurality of fiber optic adapters for connecting fiber optic connectors, splice trays for protecting optical splices between optical fibers, or other types of structures.

The fiber distribution system 10 is shown including fiber distribution terminals 30 at each of the upper floors 12b-12d. Fiber optic cables 40 interconnect the fiber distribution hub 20 and the fiber distribution terminals 30. The fiber optic cables 40 can each include one or more optical fibers contained within a protective jacket. The optical fibers of the fiber optic cables 40 can be optically coupled to the feed fiber 22 through the optical splitter 26. If the fiber optic cables 40 contain single optical fibers, optical splitters can be provided in each of the fiber distribution terminals 30 for splitting signals carried by the optical fibers of the fiber optic cables 40. The optical splitters at the fiber distribution terminals 30 can optically connect the optical fibers of the fiber optic cables 40 to connectorized pigtails housed within the fiber distribution terminals 30. In one example, the optical splitters can provide a split ratio of at least 4 to 1. Fiber optic adapters within the fiber distribution terminals 30 can be used to optically connect the connectorized pigtails to patch cords 50 routed horizontally along the floors 12b-12d from the fiber distribution terminals 30 to optical network terminals (ONT's) 60 or other types of interface devices (e.g., an interface box, an interface panel, etc.) corresponding to different subscriber locations (e.g., apartments, residences, offices, condominiums, etc.) on each floor 12a-12d. An ONT 60 is an active device that converts optical signals from the service provider to electrical signals used at the subscriber locations. The patch cords 50 can include first and second connectorized ends 50a, 50b. The first connectorized ends 50a can be optically connected to the connectorized pigtails within the fiber distribution terminals 30 by fiber optic adapters within the fiber distribution terminals 30. The second connectorized ends 50b of the patch cords 50 can be coupled to the ONT's 60.

In other examples, the fiber optic cables 40 can each include a plurality of optical fibers that are optically connected to the feed fiber 22. For such examples, the fiber distribution terminals 30 can include fan-out devices (e.g., fan-out modules) that separate the optical fibers the fiber optic cables 40 routed to each fiber distribution terminal 30 into a plurality of connectorized pigtails that can be optically connected to subscriber locations via patch cords 50 as described above. The ends of the fiber optic cables 40 that interface with the fiber distribution hub 20 can be terminated with multi-fiber fiber optical connectors. In this type of example, all of the optical splitting of the building can be accomplished at the fiber distribution hub 20. In contrast, the previous example uses a distributed optical splitting strategy where optical splitting can occur at the fiber distribution terminals 30 and/or at each floor 12b-12d.

FIGS. 2-5 show an example fiber distribution terminal 130 that is one example of a configuration for the fiber distribution terminals 30 of FIG. 1. The fiber distribution terminal 130 includes a housing 131 having a base 132 and a front cover 134.

Figure 3:
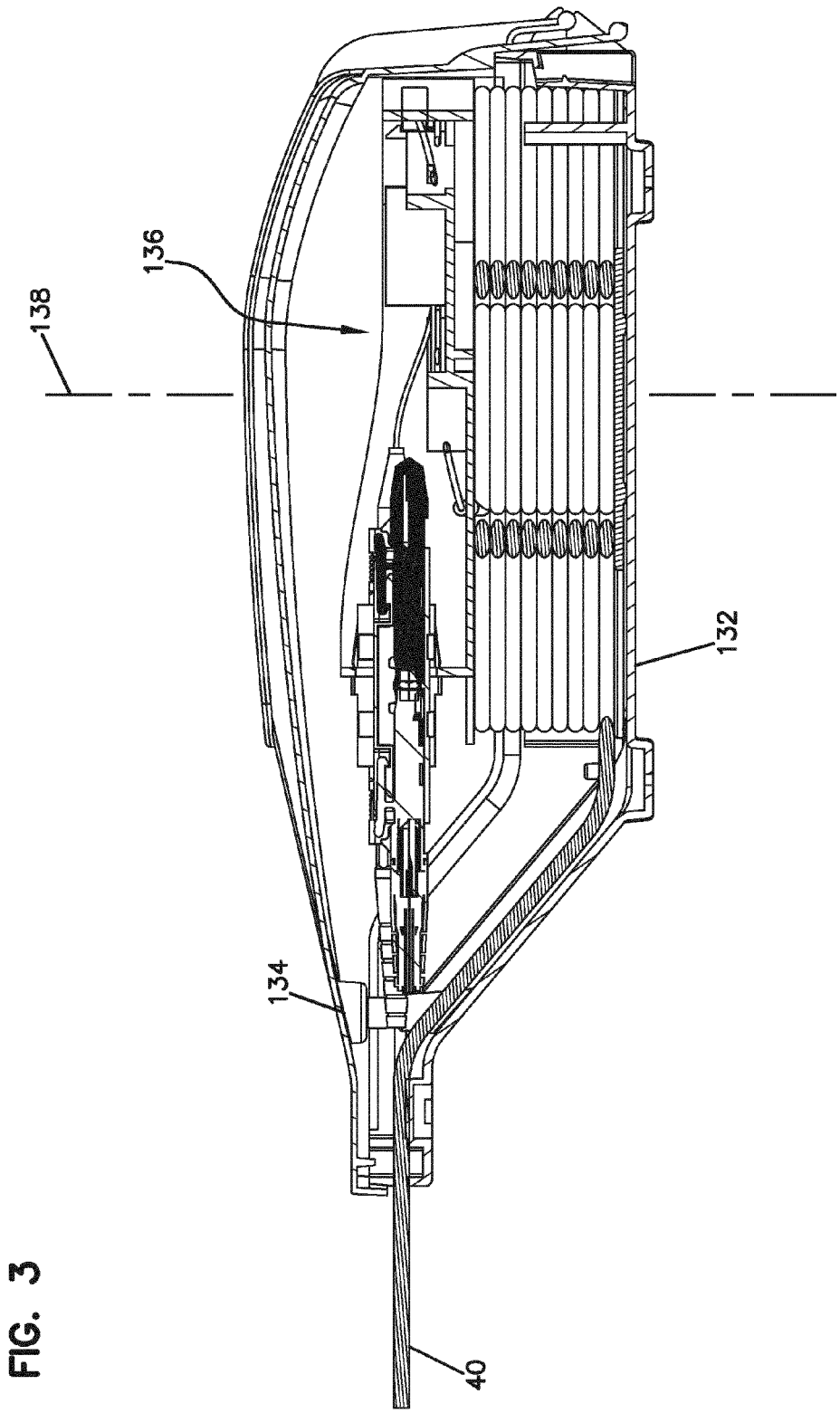
FIG. 3 is a cross-sectional view of the fiber distribution terminal of FIG. 2. relative to a base.

The front cover 134 is movable (e.g., pivotally moveable) relative to the base 132 between an open position (see FIG. 2) and a closed position (see FIG. 3). The fiber distribution terminal 130 also includes a spool arrangement 136 positioned within housing 131. The spool arrangement 136 can rotate relative to the housing 131 about an axis of rotation 138 (FIG. 3). The spool arrangement 136 can be rotatably mounted on a spindle 139 coupled to the base 132 and aligned along the axis of rotation 138 (See FIG. 4).

Figure 4:
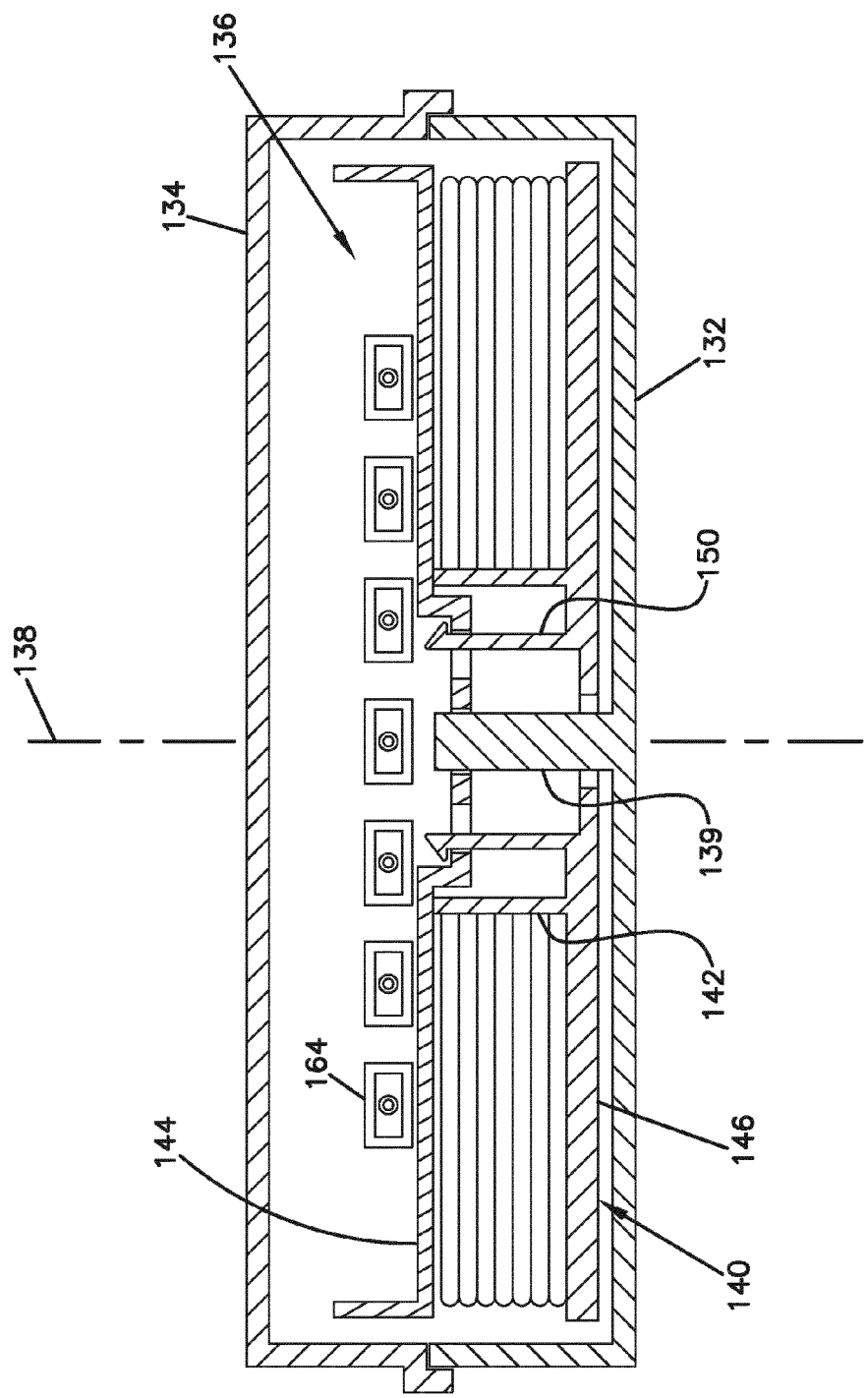
FIG. 4 is another cross-sectional view of the fiber distribution terminal of FIG. 2.
Figure 5:
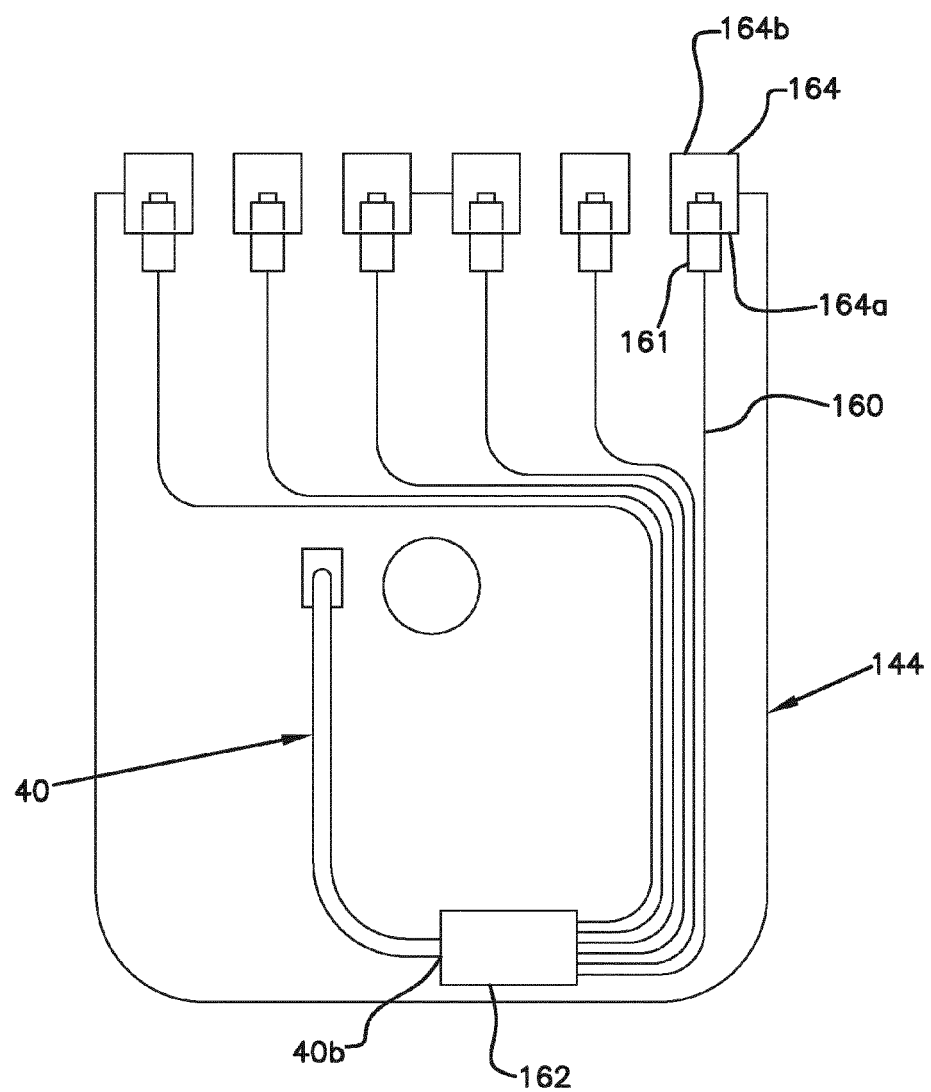
FIG. 5 is a plan view of a tray of the fiber distribution terminal of FIG. 2.

Referring to FIG. 4, the spool arrangement 136 includes a spool 140 having a drum portion 142 about which the fiber optic cable 40 is coiled. The spool arrangement 136 also includes a front flange 144 and a rear flange 146 between which the fiber optic cable 40 is coiled on the drum portion 142. The front and rear flanges 144, 146 are separated from one another along the axis of rotation 138. In the depicted example, the drum portion 142 is integrally formed with the rear flange 146 so as to form a one-piece part/unit. In the depicted example, the drum portion 142 and the rear flange 146 are coupled to the front flange 144 by a snap-fit connection. For example, flexible latches 150 are shown providing a snap-fit connection between the front flange 144 and the rear flange 146.

In one example, the fiber optic cable 40 can include a single optical fiber and can include a first end 40a (FIG. 1) that is connectorized by a single fiber optical connector (e.g., an SC connector, and LC connector, etc.). The first end 40a of the fiber optic cable 40 can be routed to the fiber distribution hub 20 for connection to the feed fiber 22. A second end 40b of the fiber optic cable 40 can be optically connected to a plurality of connectorized pigtails 160 via an optical splitter 162 (see FIG. 5). The front flange 144 can form a fiber management tray having fiber routing paths defined by one or more structures for providing fiber bend radius protection. A plurality of fiber optic adapters 164 can be supported on and carried by the front flange 144. The fiber optic adapters 164 can each include first and second ports 164a, 164b. The splitter 162 can be supported on and carried by the front flange 144. The connectorized pigtails 160 can have connectorized ends 161 received in the first ports 164a of the fiber optic adapters 164. The connectorized pigtails 160 can be routed along the front side of the front flange 144 from the splitter 162 to the fiber optic adapters 164.

To deploy the fiber distribution terminal 130, the terminal 130 is positioned at the desired floor 12b-12d and the fiber optic cable 40 is paid off from the spool arrangement 136 by pulling on the first end 40a of the fiber optic cable 40. The first end 40a of the fiber optic cable 40 is pulled down the riser 14 to the fiber distribution hub 20. As the fiber optic cable 40 is paid off from the spool arrangement 136, the spool arrangement 136 rotates relative to the housing 131 about the axis of rotation 138 defined by the spindle 139. The fiber optic adapters 164, the connectorized pigtails 160, and the optical splitter 162 are carried with the spool arrangement 136 and rotate in unison with (i.e., in concert with) the spool arrangement 136 about the axis of rotation 138 as the fiber optic cable 40 is paid off from the spool arrangement 136. After the cable 40 has been connected to the fiber distribution hub 20, the patch cords 50 can be used to connect the ONT's 60 to the fiber distribution terminal 130. For example, the first ends 50a of the patch cords 50 can be inserted into the second ports 164b of the fiber optic adapters 164. After deployment of the fiber distribution terminal 130, any remaining unused length of the fiber optic cable 40 can remain coiled on the drum portion of the spool arrangement 136 for storage within the housing 131 of the fiber distribution terminal 130.

Another aspect of the present disclosure relates to techniques and structures for effectively managing and storing excess cable length corresponding to the cables (e.g., the patch cords 50) routed between the fiber distribution terminals 30 and the subscriber interface units (e.g., the ONT's 60). In one example, spool devices are mounted behind the subscriber interface units and are used to store patch cable over-length. The spool devices can be configured to be usable with subscriber interface units provided by a variety of different suppliers.

Figure 6:
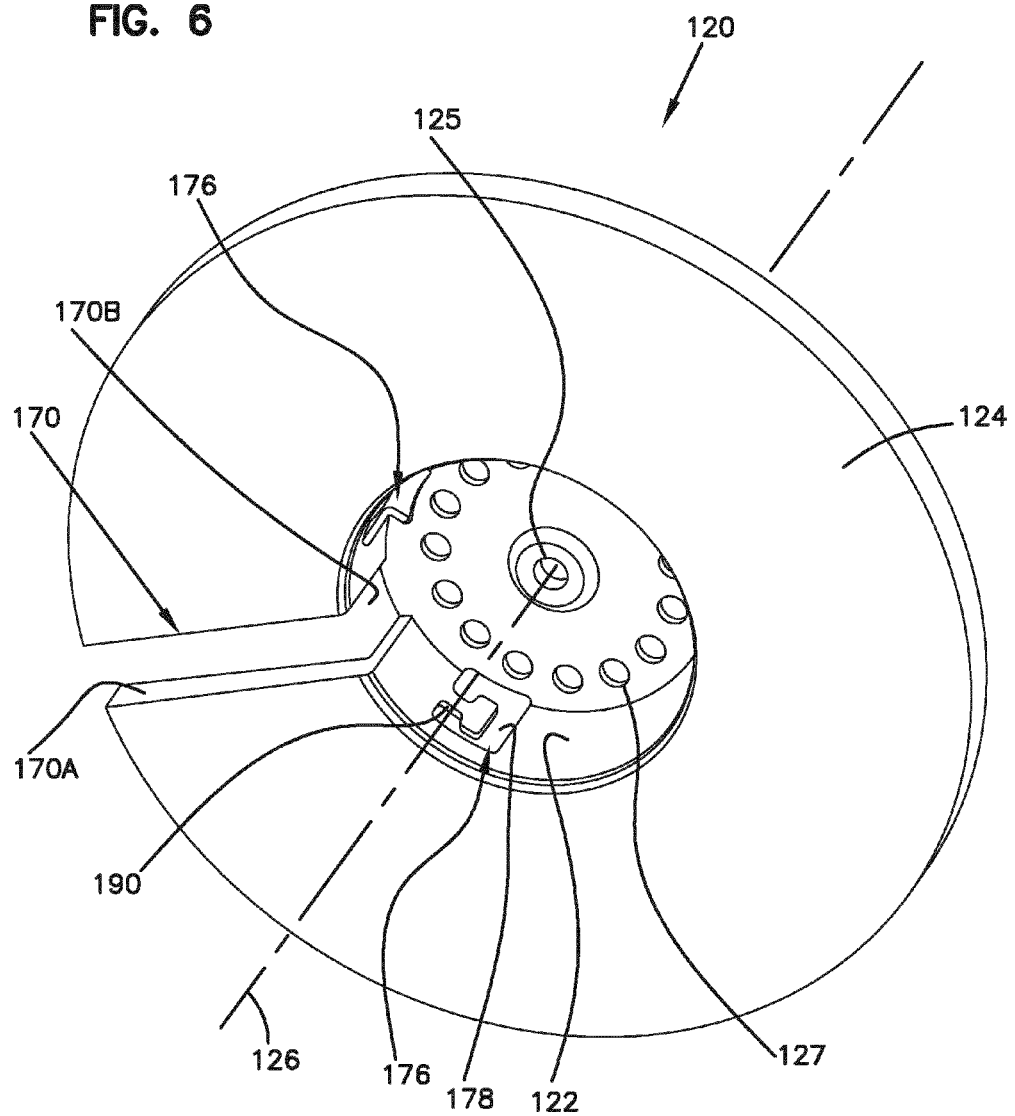
FIG. 6 is a front perspective view of a cable storage spool in accordance with the principles of the present disclosure.
Figure 7:
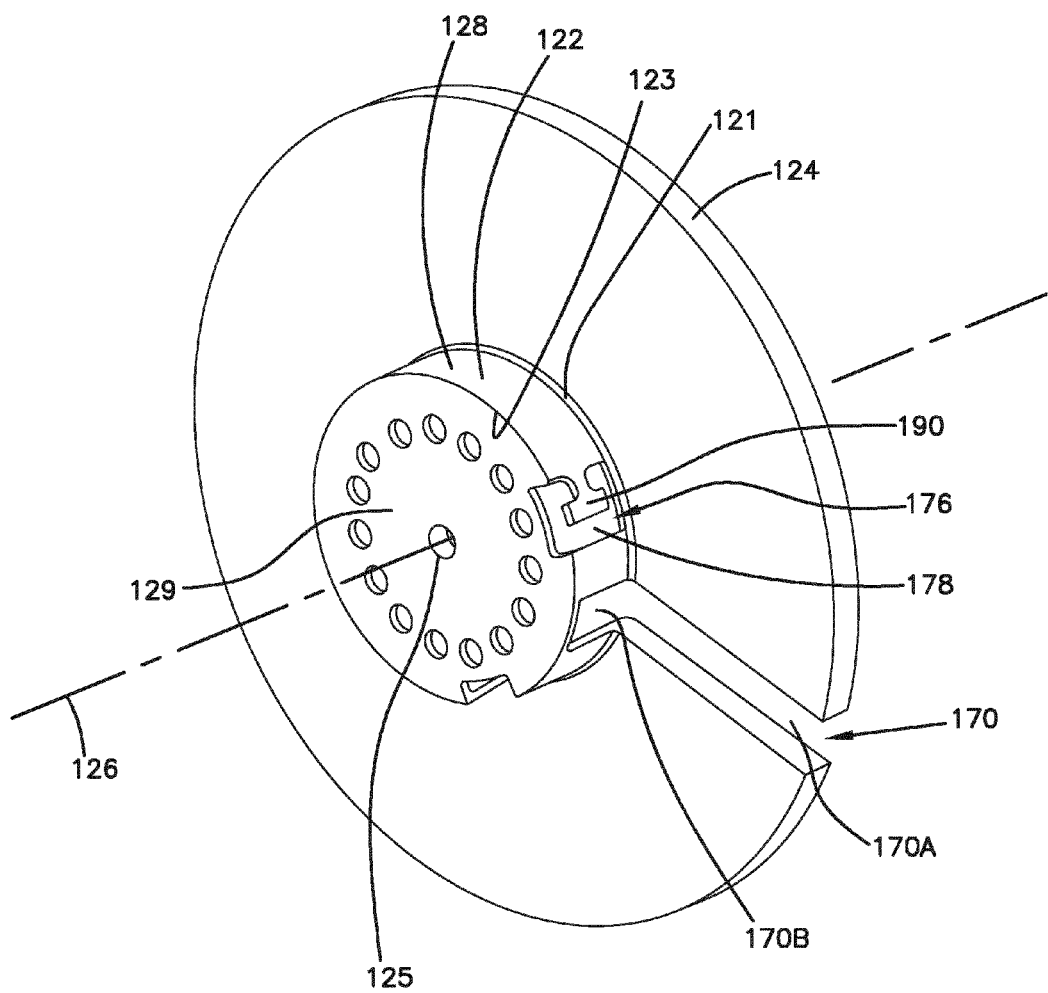
FIG. 7 is a rear perspective view of the spool of FIG. 6.

FIGS. 6-9 illustrate a cable over-length storage spool 120 in accordance with principles of the present disclosure. The spool 120 includes a drum portion 122 and a flange portion 124. In one example, spool 120 includes a single flange that is formed by the flange portion 124. The spool 120 is adapted to be rotated about an axis of rotation 126. The drum portion 122 includes a side wall 128 that extends circumferentially around the axis of rotation 126 (FIG. 7). The side wall 128 also extends axially along the axis of rotation 126 between front and rear ends 121, 123 of the drum portion 122. The front end 121 of the drum portion 122 connects to the flange portion 124. The flange portion 124 extends radially outwardly from the side wall 128 of the drum portion 122. In one example, the flange portion 124 is unitarily formed as a single piece with the drum portion 122. The drum portion 122 further includes a rear end wall 129 that is generally perpendicular relative to the axis of rotation 126 and is generally parallel with respect to the flange portion 124. The rear end wall 129 defines a central opening 125 centered about the axis of rotation 126. The rear end wall 129 also defines a plurality of rotation stop openings 127 spaced about the axis of rotation 126 (FIG. 8).

Referring to FIGS. 6-8, the spool 120 defines a slot 170. The slot 170 includes a radial portion 170A that extends through the flange portion 124 from an outer diameter 172 to an inner diameter 174 of the flange portion 124. The inner diameter 174 is located at an interface between the flange portion 124 and the drum portion 122. The slot 170 also includes an axial portion 170B defined within the side wall 128 of the drum portion 122 (see FIG. 7). The axial portion 170B extends generally from the front end 121 to the rear end 123 of the drum portion 122. The axial portion 170B of the slot 170 is positioned between two cable tie-down locations 176 (see FIG. 8). Each of the cable tie-down locations 176 includes an opening 178 defined through the side wall 128 and a tie-down securement location 190 positioned within the opening 178 (see FIG. 7). The tie-down securement locations 190 are depicted as being generally T-shaped.

Figure 10:
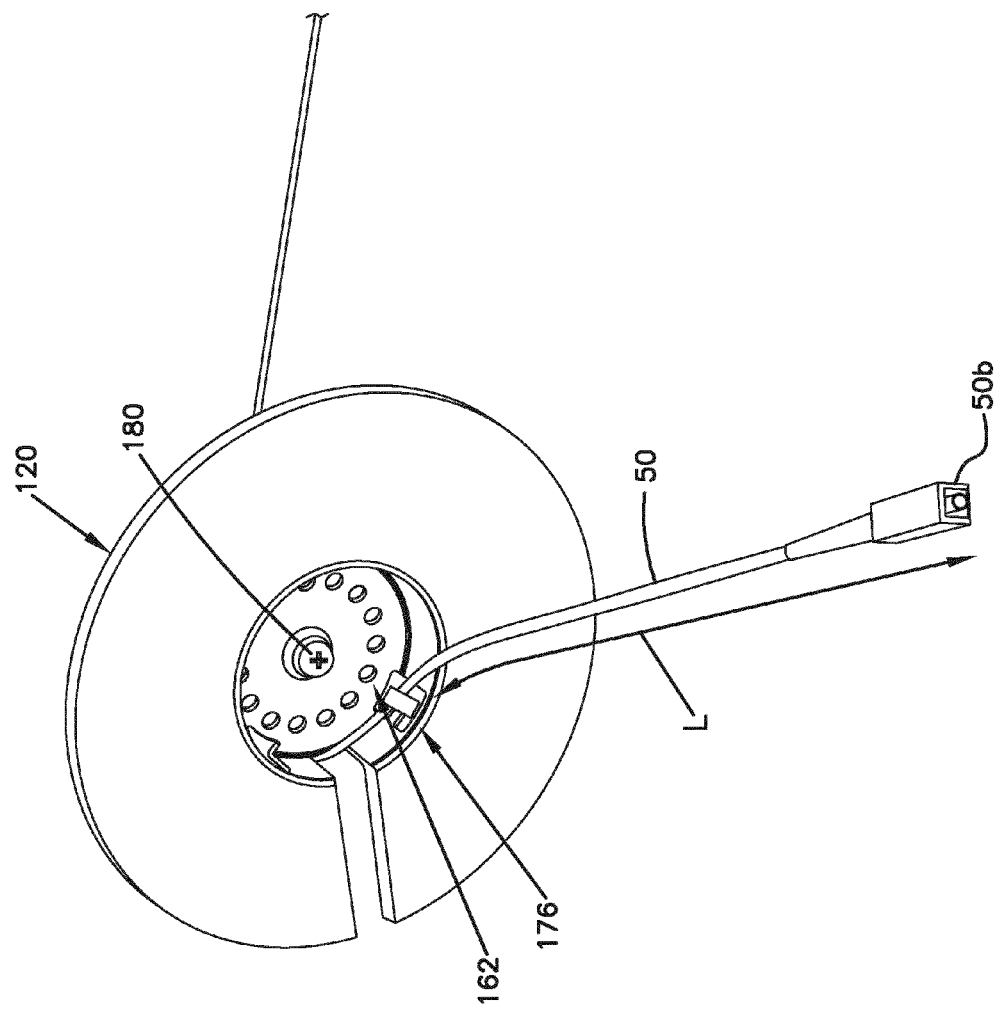
FIGS. 10-13 show method steps for using the spool of FIG. 6 to store excess fiber optic cable behind a subscriber interface unit such as an ONT.
Figure 11:
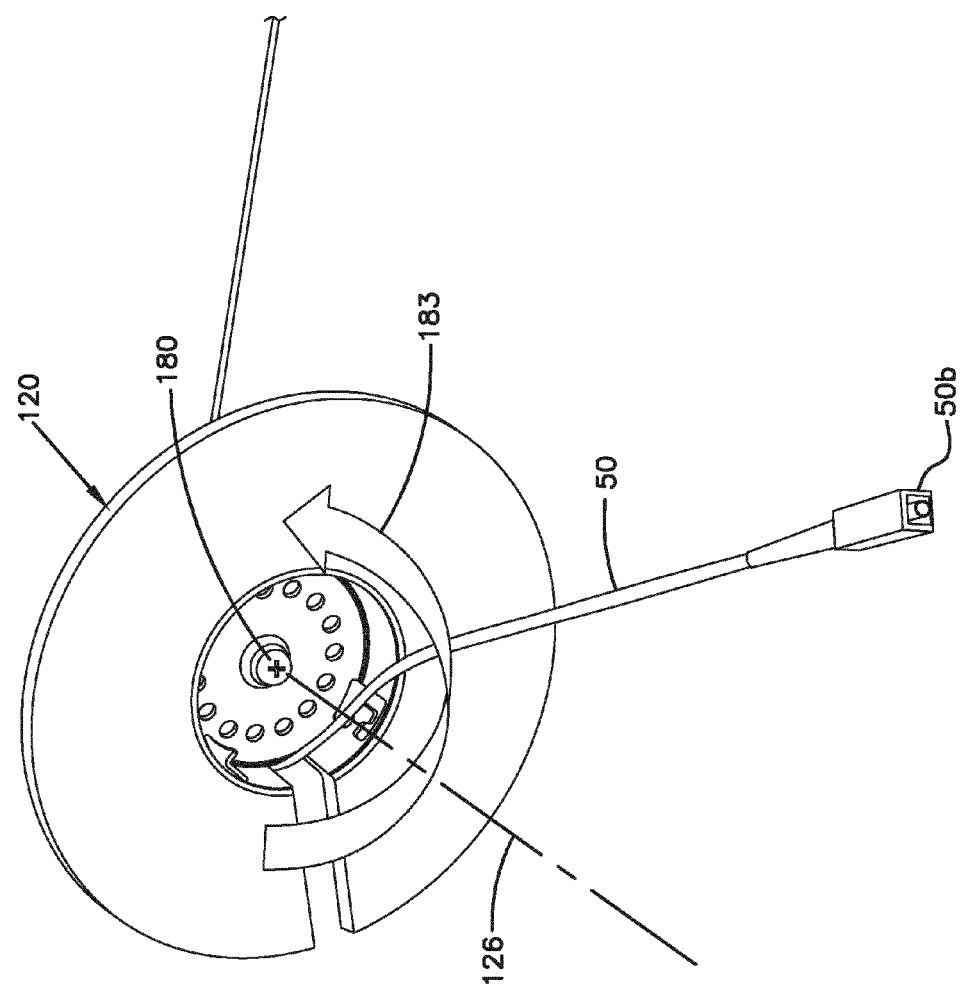

The patch cords 50 used to interconnect the fiber distribution terminals 30 to the optical network terminals 60 often have standard lengths. Therefore, depending upon the positioning of the optical network terminals 60 relative to the fiber distribution terminals 30, the patch cords 50 often have excess length (i.e., overlength) that needs to be managed and stored. FIGS. 10-13 illustrate a method for using the spool 120 to effectively store overlength of one of the patch cables 50. In practice, the first connectorized end 50A of the patch cord 50 can be plugged into a second port 164b of one of the fiber optic adapters 164 corresponding to one of the fiber distribution terminals 130. The patch cord 50 is then routed to the desired optical network terminal 60. Upon reaching the optical network terminal 60, the patch cord 50 is routed through the slot 170 of the spool 120 and secured to the spool 120 at one of the cable tie-down locations 176 using a cable tie 166 (FIG. 10). In one example embodiment, the patch cord 50 is tied down such that a length L of patch cord 50 defined between the tie-down location 176 and the connectorized second end 50B of the patch cord 50 is sufficiently long to allow the connectorized second end 50B of the patch cord 50 to be plugged into the ONT 60. FIG. 10 shows the patch cord 50 in the tied-down configuration.

FIG. 10 also shows the spool 120 secured to a desired ONT mounting location by a central fastener 180. In one example, the desired mounting location for the ONT is on a wall. The central fastener 180 is shown as a screw that extends through the central opening 125 of the spool 120 and that aligns along and defines the axis of rotation 126. In one example, the fastener 180 loosely secures the spool 120 to the wall such that the spool 120 is free to rotate relative to the wall about the fastener 180.

Figure 12:
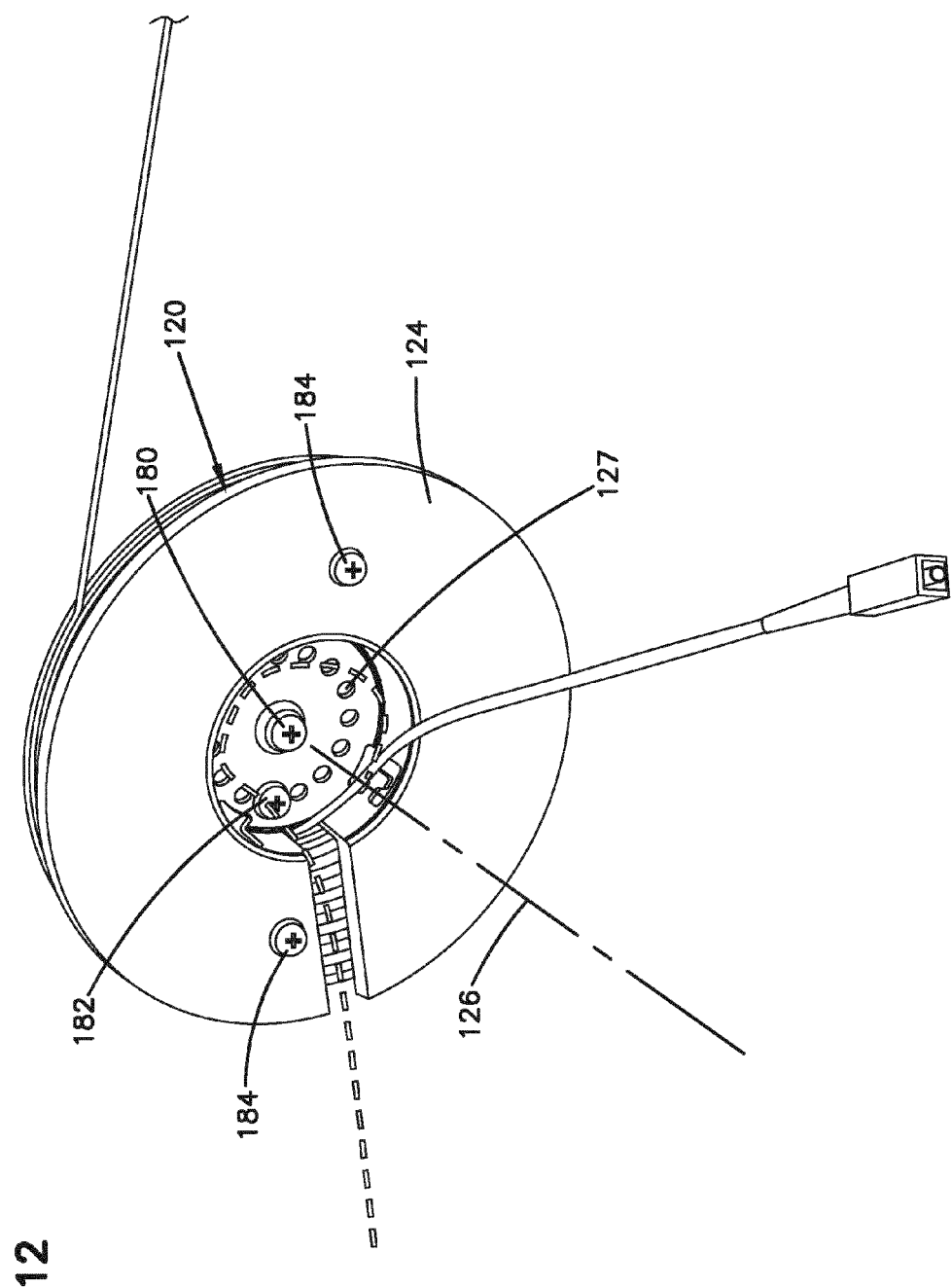

Once the patch cord 50 has been secured to the spool 120 with the cable tie 166, the spool 120 is turned clockwise (see arrow 183 at FIG. 11) about the fastener 180 to coil the overlength of the patch cord 50 onto the drum portion 122. Once all of the overlength of the patch cord 50 has been coiled about the drum portion 122, an anti-rotation fastener 182 can be inserted through one of the rotation stop openings 127 of the spool 120 and secured to the wall as shown at FIG. 12. The fastener 182 can be a screw. By securing the fastener 182 though one of the rotation stop openings 127, the spool 120 is rotationally locked in place to prevent further rotation of the spool 120 about the axis of rotation 126. It will be appreciated that the fastener 180 can also be tightened to limit rotation of the spool 120 about the axis of rotation 126.

Figure 13:
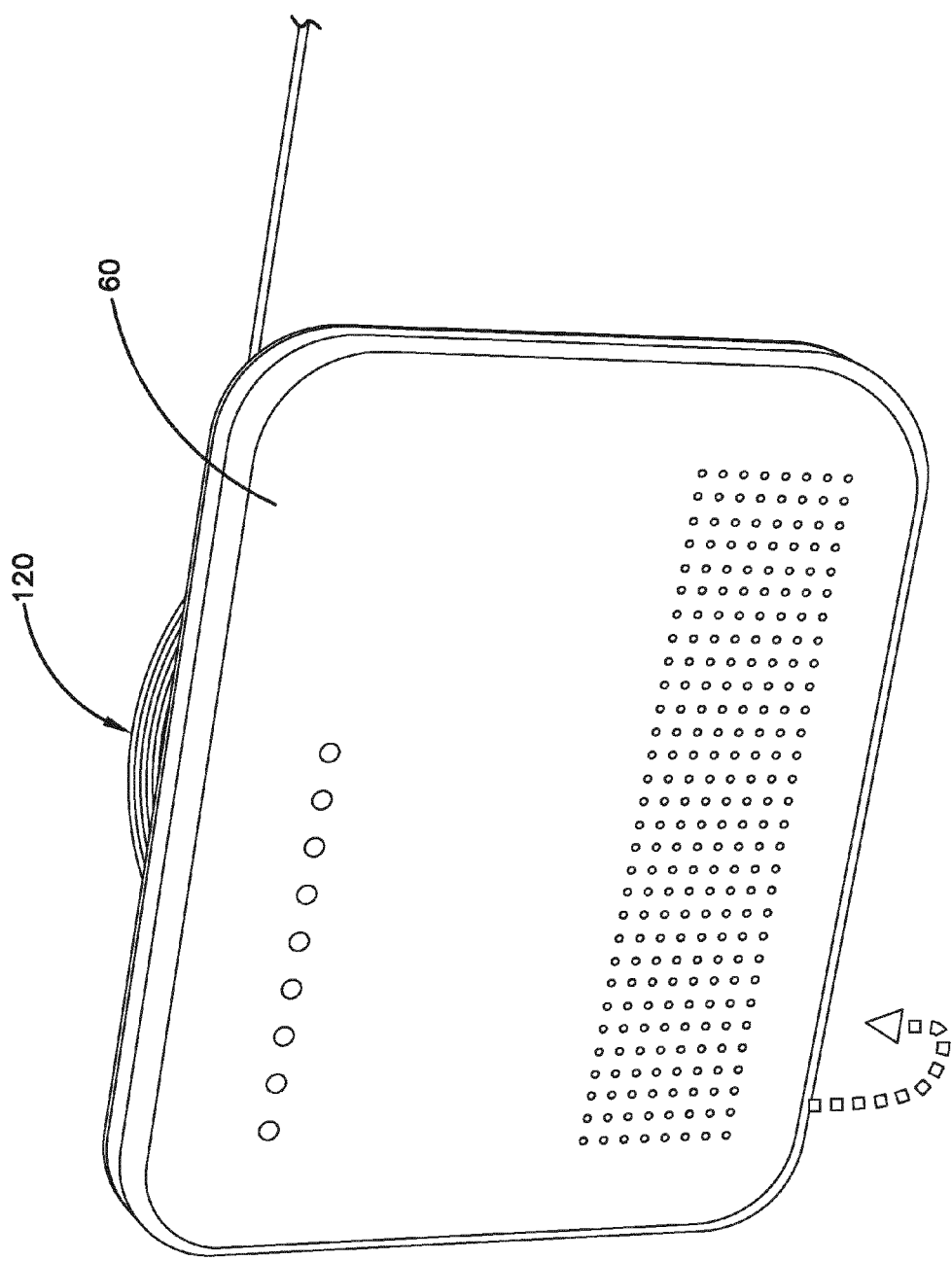
Figure 15:
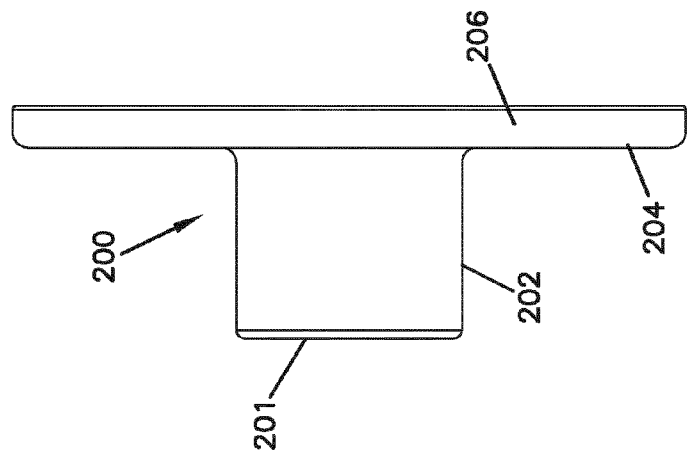
FIG. 15 is a side view of the cable storage spool of FIG. 14.
Figure 14:
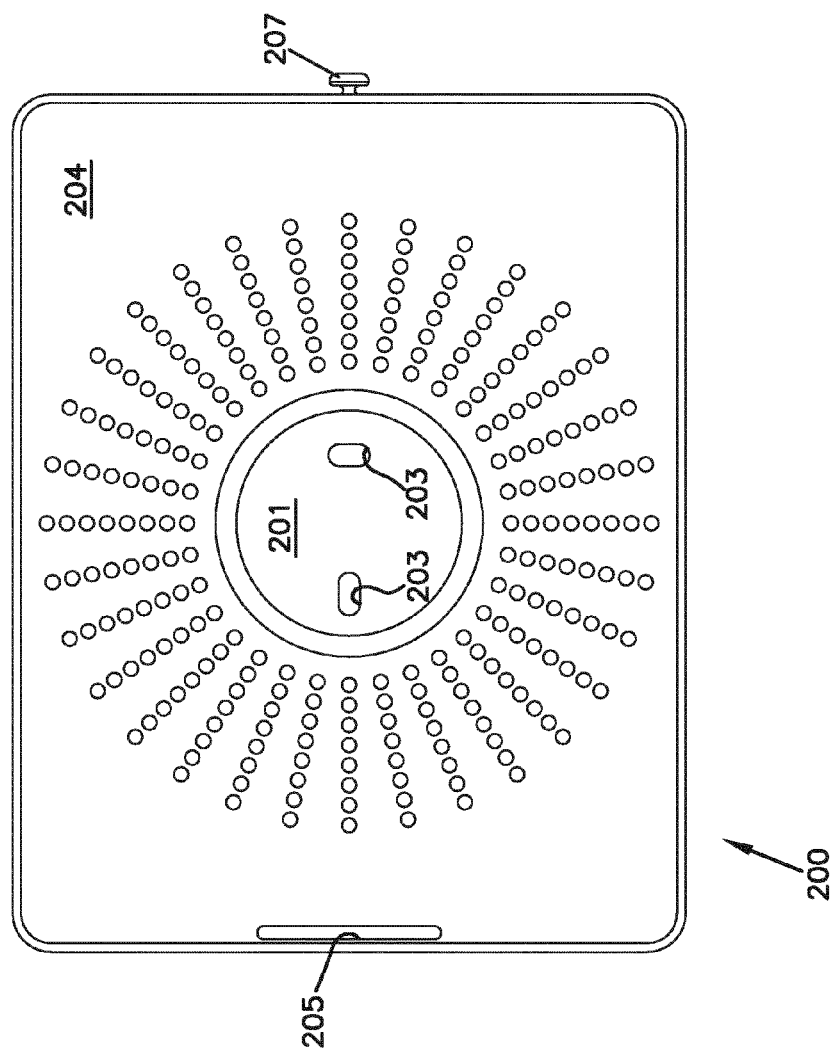
FIG. 14 is a front view of another example cable storage spool.

Once the spool 120 has been locked in position as shown at FIG. 12, ONT mounting fasteners 184 (e.g., screws) can be fixed to the front side of the flange portion 124. In one example, the ONT mounting fasteners 184 are self-tapping screws that can be threaded into the flange portion 124. In one example, flange portion 124 has a plastic construction that can readily receive self-tapping screws. The fasteners 184 are preferably secured to the flange portion 124 at locations corresponding to mounting locations (e.g., mounting locations, mounting slots, mounting holes, etc.) provided on the backside of the ONT 60. By using the fasteners 180, the ONT 60 can be mounted to the front side of the flange portion 124 in the same manner the ONT 60 would ordinarily be mounted directly to a wall. Once the ONT 60 is mounted to the front side of the flange portion 124, the second connectorized end 50B of the patch cord 50 can be plugged into the ONT 60 as shown at FIG. 13.

In certain examples, indicia can be provided on the flange portion 124 for marking locations (e.g., to form a template) indicating where the fasteners 184 should be placed to correspond to attachment locations of certain types of ONT devices.

In another example, the patch cord 50 can be installed on the spool 120 at the factory with the patch cord 50 tied down to the spool 120 adjacent the second connectorized end portion 50B and with the entire length of the path cord coiled about the drum portion 122 of the spool 120. When used in this way, the spool 120 can initially be secured to a desired mounting location of an ONT by using the fastener 180 inserted through the central opening 125 as described above. Next, the first connectorized end 50A of the patch cord 50 is pulled toward the fiber distribution terminal 30 causing the spool 120 to spin about the fastener 180, thereby allowing the patch cord 50 to be paid out from the drum portion 122 of the spool 120. Once a sufficient length of the patch cord 50 has been paid out from the spool 120 to reach the fiber distribution terminal 30, the spool 120 is rotationally locked in place by securing the rotation stopping fastener 182 through one of the rotation stop openings 127. Thereafter, the ONT mounting fasteners 184 are secured to the flange portion 124, the ONT 60 is mounted on the fasteners 184 and the second end 50B of the patch cord 50 is plugged into the ONT 60.

FIGS. 14-18 illustrate another example cable over-length storage spool 200 configured in accordance with principles of the present disclosure. The spool 200 includes a drum portion 202 and a flange portion 204. In one example, spool 200 includes a single flange that is formed by the flange portion 204. The spool 200 is adapted to be mounted to a wall or other surface. In an example, the spool 200 is rotationally fixed to the surface. In certain implementations, the drum portion 202 attaches to the surface and the flange portion 204 is spaced from the surface. In an example, an end face 201 of the drum portion 202 can define one or more fastener apertures 203 through which fasteners can be inserted to mount the spool 200 to the surface.

Excess length of cable can be wound around the drum portion 202 between the flange portion 204 and the surface. In certain implementations, the flange portion 204 is sized and structure to support the ONT 60. In certain implementations, the flange portion 204 defines vent holes for the ONT 60. In certain implementations, the flange portion 204 includes a peripheral wall 206 that extends away from the drum portion 202. In the example shown, the flange portion 204 is rectangular in shape. In other implementations, the flange portion 204 can be round or any desired shape.

In some implementations, an ONT mounts to the flange portion 204 of the spool 200. In an example, the ONT can be mounted to the flange portion 204 using one or more fasteners (e.g., screws, pems, etc.). However, certain types of ONTs may have different fastener aperture configurations or be otherwise configured to mount to a surface. In certain implementations, the spool 200 is configured to enable multiple types of ONTs to mount to the flange portion 204 regardless of how the ONTs are configured to be attached to a surface. For example, in certain implementations, the ONT 60 can be attached to the spool 200 using a strap arrangement 210.

Figure 16:
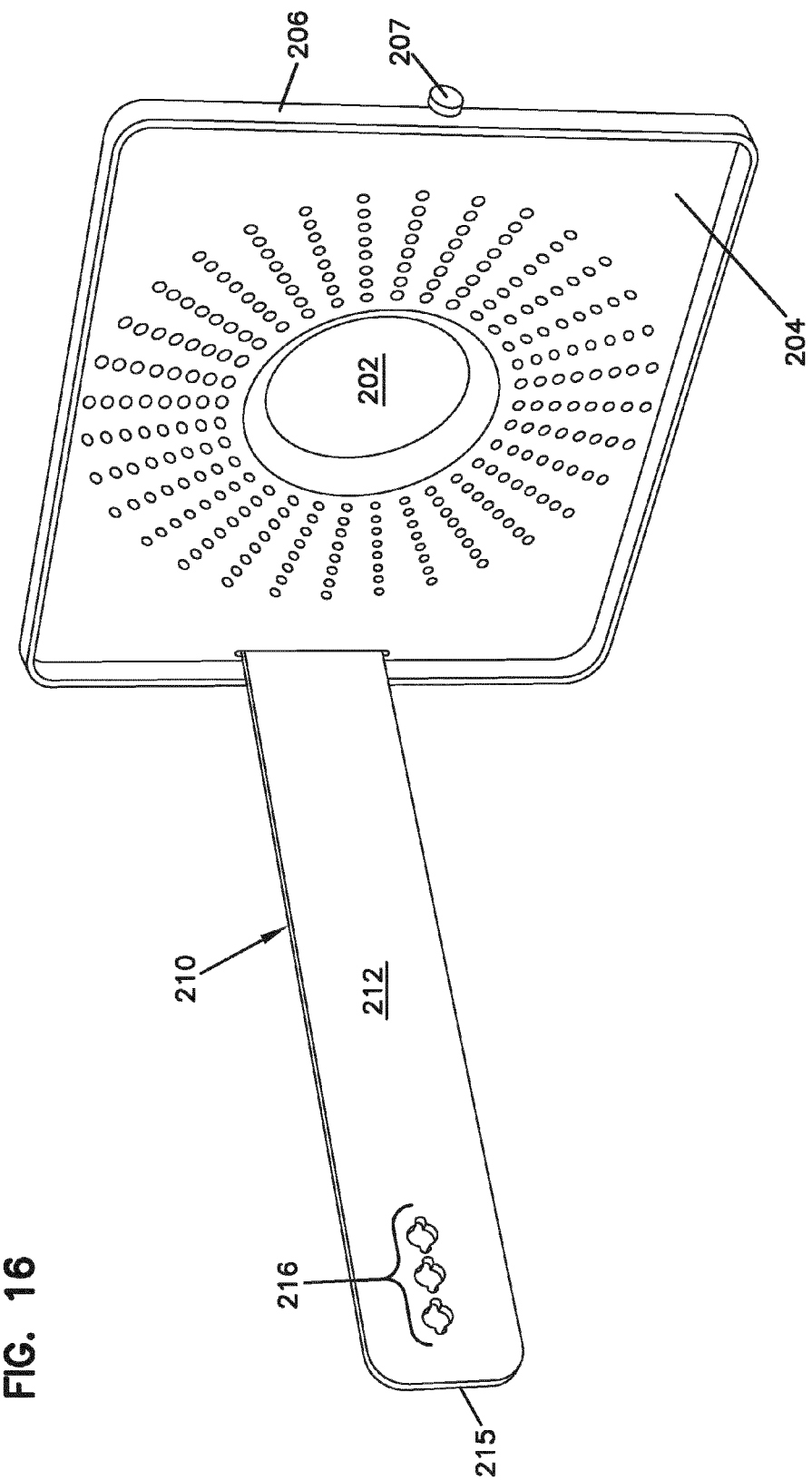
FIG. 16 is a perspective view of the cable storage spool of FIG. 14 with a strap arrangement mounted thereto.
Figure 17:
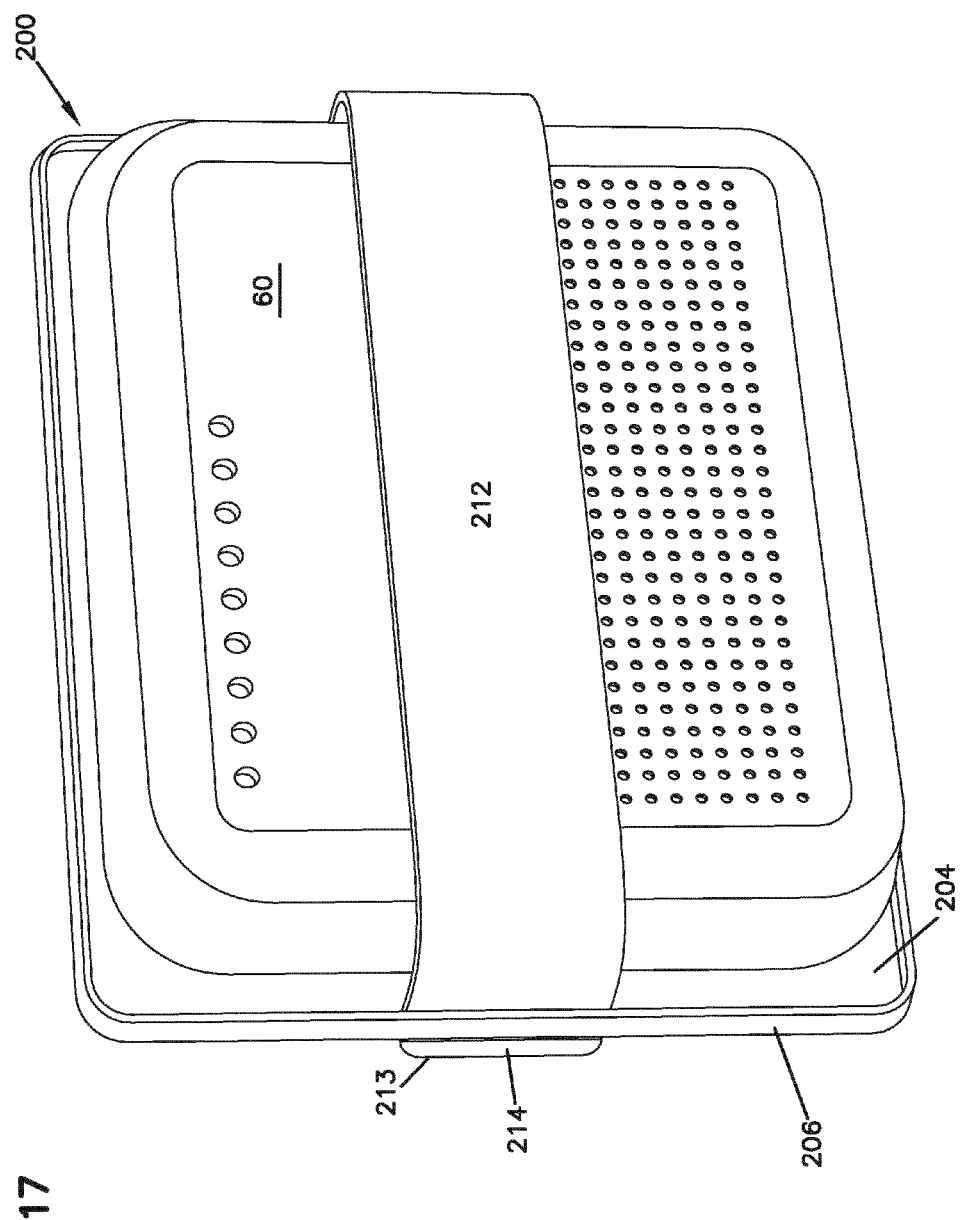
FIG. 17 is a front perspective view of the cable storage spool of FIG. 16 with the strap holding an ONT to the spool.
Figure 18:
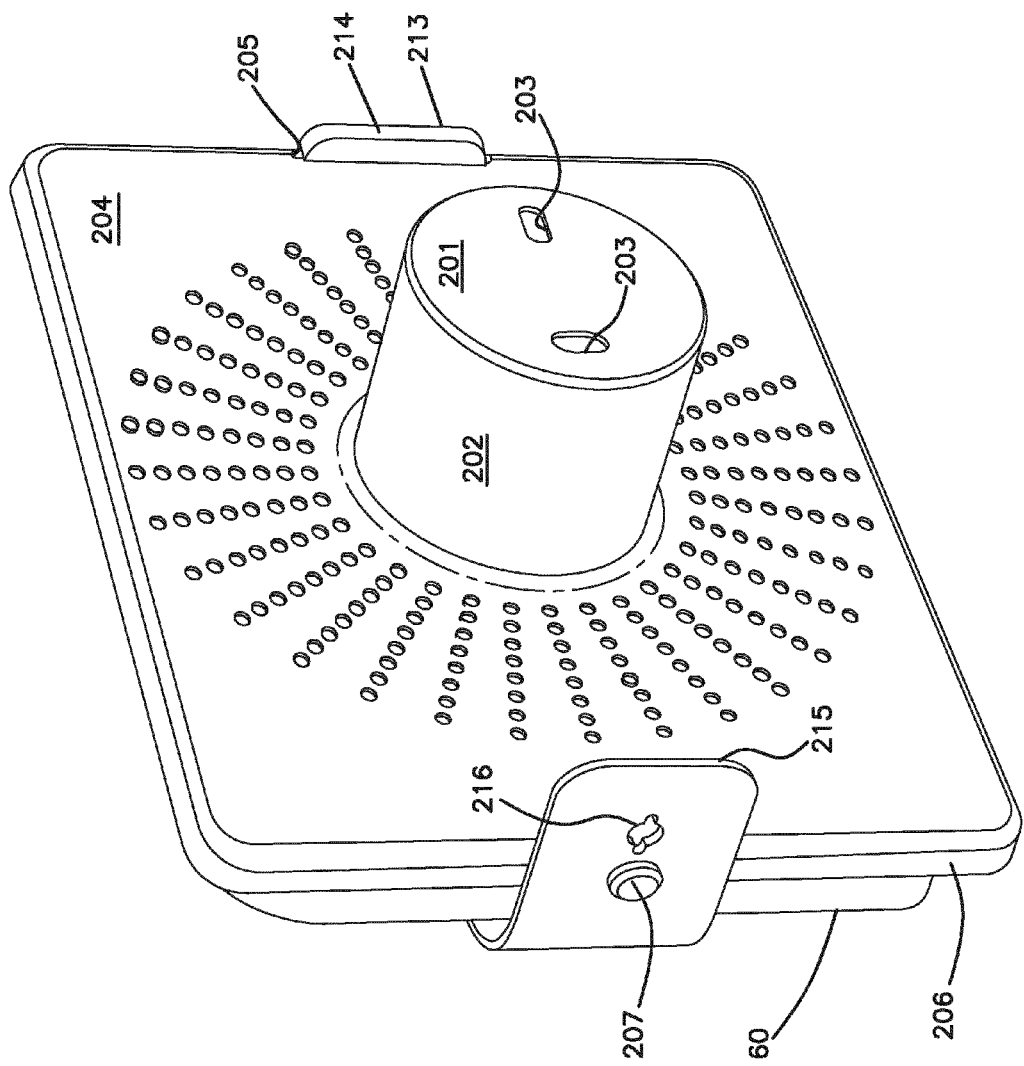
FIG. 18 is a rear perspective view of the cable storage spool of FIG. 17.

In the example shown in FIGS. 16-18, the strap arrangement 210 includes a flexible strap member 212 extending from a first end 213 to a second end 215. The first end 213 is attached to one side of the flange portion 204 and the second end 215 is configured to attach to another (e.g., opposite) side of the flange portion 204. For example, the first end 213 may extend through an aperture 205 defined in the flange portion 204 of the spool with an enlarged portion 214 anchoring the first end 213 to the flange portion 204. The second end 215 may define one or more apertures 216 sized to fit over a peg 207 coupled to the flange portion 204. In the example shown, the second end 215 defines three apertures 216. In an example, the peg 207 may extend outwardly from the peripheral wall 206 of the flange portion 204.

To install the ONT 60 using the strap arrangement 210, a fiber cable is routed from a terminal 130 to a subscriber location or other ONT mounting location. The spool 200 is mounted at the location and excess cable is wound around the drum portion 202 of the spool 200. A distal end of the cable is left free hanging from the spool 200. A desired ONT 60 is disposed against the flange portion 204 of the spool 200 between the first end 213 of the strap 212 and the peg 207. The strap 212 is moved across the ONT 60 so that the second end 215 approaches the peg 207. A user pushes the peg 207 through an appropriate one of the apertures 216 to hold the ONT 60 securely to the flange portion 204.

In other implementations, the strap arrangement 210 can be utilized with the cable over-length storage spool 120 described above. For example, an aperture and a peg can be added to the flange portion 124 of the spool 120. A first end 213 of a strap 212 can be attached at the aperture and a second end 215 of the strap 212 can be selectively attached to the peg. The strap arrangement 210 may enable various types of ONTs 60 to be mounted to the spool 120.

Various modifications and alterations of this disclosure will become apparent to those skilled in the art without departing from the scope and spirit of this disclosure, and it should be understood that the scope of this disclosure is not to be unduly limited to the illustrative examples set forth herein.

LIST OF REFERENCE NUMERALS AND CORRESPONDING FEATURES 10 fiber optic distribution system
12 multi-dwelling unit
12a-12d floors
14 a riser
20 fiber distribution hub
21 a service provider
22 feed fiber
24 a housing 24
26 optical splitters 26
30 fiber distribution terminals
40 fiber optic cables
40a, 40b first and second ends
50 patch cords
50a, 50b first and second connectorized ends
60 optical network terminals
120 a cable over-length storage spool
121 front end
122 drum portion
123 rear end
124 flange portion
125 central opening
126 axis of rotation
127 rotation stops
128 side wall
129 rear end wall
130 fiber distribution terminal
131 a housing
132 a base
134 a front cover
136 spool arrangement
138 axis of rotation
139 spindle
140 spool
142 drum portion
144 front flange
146 rear flange
150 flexible latches
160 connectorized pigtails
161 connectorized ends
162 optical splitter
166 cable tie
164 fiber optic adapters
164a, 164b first and second ports 170 slot
170A radial portion
170B axial portion
172 outer diameter
174 inner diameter
176 cable tie-down locations
178 opening
180 central fastener
182 anti-rotation fastener
184 ONT mounting fasteners
190 tie-down securement location
200 storage spool
201 end face
202 drum portion
203 fastener apertures
204 flange portion
205 aperture
206 peripheral wall
207 peg
210 strap arrangement
212 elongated strap
213 first end
214 enlarged portion
215 second end
216 apertures

What is claimed is:

1. A spool system comprising:
a lockable spool comprising:
a drum portion having a front end and a flangeless rear end, the drum portion also including a side wall that extends between the front and rear ends of the drum portion and surrounds an axis of rotation of the spool, the drum portion further including a rear end wall at the rear end of the drum portion, the rear end wall defining a wall-mount fastener opening aligned with the axis of rotation of the spool; and
a single flange portion coupled to the front end of the drum portion, the flange portion extending radially outwardly from the axis of rotation of the spool; and
a wall-mount fastener, the wall-mount fastener enabling free rotation of the lockable spool when the spool is unlocked and when the wall-mount fastener is inserted through the wall-mount fastener opening and fastened to a wall.

2. The spool system of claim 1, further comprising a strap arrangement coupled to the flange portion to hold any of a plurality of types of optical network terminals to the lockable spool.

3. The spool system of claim 2, wherein the strap arrangement has a first end attached to the flange portion and a second end defining a plurality of apertures.

4. The spool system of claim 1, wherein the lockable spool defines a slot having a radial portion that extends though the flange portion and an axial portion that extends through the side wall of the drum portion.

5. The spool system of claim 4, wherein the axial portion of the slot is positioned between two cable tie-down locations defined at the side wall of the drum portion.

6. The spool system of claim 1, wherein the rear end wall defines at least one rotation locking opening for receiving a fastener for locking rotation of the lockable spool about the axis of rotation, the rotation locking opening being offset from the axis of rotation.

7. The spool system of claim 1, wherein the spool includes a single flange formed by the single flange portion.

8. A method for storing excess cable from a cable routed to a subscriber interface unit, the method comprising:
attaching a flangeless rear end of a drum portion of a lockable storage spool to a wall using a fastener, the fastener enabling free rotation of the attached storage spool when the spool is unlocked;
winding the excess cable behind a single-flanged front end of the lockable storage spool and on the drum of the lockable storage spool by turning the lockable storage spool about the fastener; and
mounting the subscriber interface unit on the lockable storage spool.

9. The method of claim 8, wherein the subscriber interface unit is an optical network terminal.

10. The method of claim 8, wherein mounting the subscriber interface unit on the lockable storage spool includes strapping the subscriber interface unit to the lockable storage spool.

11. The method of claim 10, wherein strapping the subscriber interface unit to the lockable storage spool further comprises disposing a flexible strap across the subscriber interface unit and inserting a peg into one of a plurality of apertures defined in the flexible strap, wherein the peg extends outwardly from the lockable storage spool.

12. The method of claim 8, wherein subscriber interface unit is hung on fasteners secured at a front side of a flange of the lockable spool.

13. The method of claim 12, wherein the fasteners are self-tapping screws.

14. The method of claim 8, wherein the lockable spool is locked against rotation after the excess cable has been wound on the spool, and wherein the subscriber interface unit is mounted on the spool after the spool has been locked against rotation.

15. A method for installing a subscriber interface unit, the method comprising:
attaching a flangeless rear end of a drum portion of a lockable storage spool to a wall using a fastener, the fastener enabling free rotation of the attached lockable storage spool when the spool is unlocked, the drum portion of the lockable storage spool having cable pre-wound thereon behind a single-flanged front end of the storage spool;
deploying the cable from the lockable storage spool by turning the lockable storage spool about the fastener; and
mounting the subscriber interface unit on the lockable storage spool.

16. The method of claim 15, wherein the lockable spool is locked against rotation after the cable has been deployed, and wherein the subscriber interface unit is mounted on the lockable spool after the lockable spool has been locked against rotation.

17. The method of claim 15, wherein mounting the subscriber interface unit on the lockable storage spool includes strapping the subscriber interface unit to the lockable storage spool.

18. The method of claim 17, wherein strapping the subscriber interface unit to the lockable storage spool further comprises disposing a flexible strap across the subscriber interface unit and inserting a peg into one of a plurality of apertures defined in the flexible strap, wherein the peg extends outwardly from the lockable storage spool.

19. A method for installing a subscriber interface unit, the method comprising:
attaching a storage spool to a wall at a subscriber location;
routing a cable from a fiber optic terminal to the subscriber location;

storing excess length of the cable by winding the excess length around a drum portion of the storage spool between the wall and a first side of a flange portion of the storage spool; and mounting the subscriber interface unit to a second side of the flange portion by extending a strap member across the subscriber interface unit from one end of the flange portion to an opposite end and inserting a peg of the flange portion through an aperture defined in the strap member.

20. The method of claim 19, further comprising selecting the aperture from a plurality of apertures defined in the strap member based on a size of the subscriber interface unit.

21. A spool comprising:
a drum portion having a front end and a rear end, the drum portion also including a side wall that extends between the front and rear ends of the drum portion and surrounds an axis of rotation of the spool, the drum portion further including a rear end wall at the rear end of the drum portion, the rear end wall defining a fastener opening aligned with the axis of rotation of the spool;
a flange portion coupled to the front end of the drum portion, the flange portion extending radially outwardly from the axis of rotation of the spool; and
a strap arrangement coupled to the flange portion to hold any of a plurality of types of optical network terminals to the spool, wherein the strap arrangement has a first end attached to the flange portion and a second end defining a plurality of apertures.

22. A method for storing excess cable from a cable routed to a subscriber interface unit, the method comprising:
attaching a storage spool to a wall using a fastener;
winding the excess cable on the storage spool by turning the storage spool about the fastener; and
mounting the subscriber interface unit on the storage spool by strapping the subscriber interface unit to the storage spool, wherein the strapping comprises disposing a flexible strap across the subscriber interface unit and inserting a peg into one of a plurality of apertures defined in the flexible strap, wherein the peg extends outwardly from the storage spool.

23. A method for installing a subscriber interface unit, the method comprising: attaching a storage spool to a wall using a fastener, the storage spool having cable pre-wound thereon;
deploying the cable from the storage spool by turning the storage spool about the fastener; and
mounting the subscriber interface unit on the storage spool by strapping the subscriber interface unit to the storage spool, wherein the strapping comprises disposing a flexible strap across the subscriber interface unit and inserting a peg into one of a plurality of apertures defined in the flexible strap, wherein the peg extends outwardly from the storage spool.

* * * * *